(12) United States Patent
Vasthimal et al.

(10) Patent No.: US 11,037,226 B2
(45) Date of Patent: *Jun. 15, 2021

(54) SYSTEM, METHOD, AND MEDIA FOR IDENTIFYING TOP ATTRIBUTES

(71) Applicant: eBay Inc., San Jose, CA (US)

(72) Inventors: Deepak Kumar Vasthimal, San Jose, CA (US); Avishek Mukherjee, Yellenahalli (IN)

(73) Assignee: EBAY INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/748,334

(22) Filed: Jan. 21, 2020

(65) Prior Publication Data
US 2020/0160432 A1    May 21, 2020

Related U.S. Application Data

(63) Continuation of application No. 14/985,906, filed on Dec. 31, 2015, now Pat. No. 10,580,064.

(51) Int. Cl.
*G06Q 30/00* (2012.01)
*G06Q 30/06* (2012.01)
(Continued)

(52) U.S. Cl.
CPC ....... *G06Q 30/0643* (2013.01); *G06F 16/248* (2019.01); *G06F 16/24578* (2019.01);
(Continued)

(58) Field of Classification Search
None
See application file for complete search history.

(56) References Cited

U.S. PATENT DOCUMENTS

| 7,885,956 B2 | 2/2011 | Danish et al. |
| 8,024,207 B2 | 9/2011 | Ouimet |
| (Continued) | | |

FOREIGN PATENT DOCUMENTS

| CN | 108475388 A | 8/2018 |
| KR | 10-1292713 B1 | 8/2013 |
| WO | 2017/117417 A1 | 7/2017 |

OTHER PUBLICATIONS

Ghobadi, A., A Virtual Catalog Generated from Web Pages of Vendors for Comparative Shopping, Apr. 1, 2007, Fourth International Conference on Information Technology, pp. 463-468 (Year: 2007).*

(Continued)

*Primary Examiner* — Jeffrey A. Smith
*Assistant Examiner* — Timothy J Kang
(74) *Attorney, Agent, or Firm* — Shook, Hardy & Bacon L.L.P.

(57) ABSTRACT

In various example embodiments, a system and method for identifying top attributes are presented. Text content from an electronic document describing a product is extracted. A plurality of attributes associated with the product are identified using the extracted text content. A descriptor word proximate to each of the plurality of attributes in the extracted text content is detected. A weight is assigned to each descriptor word proximate to each of the plurality of attributes. The plurality of attributes are ranked based on the weight of the descriptor word proximate to each of the plurality of attributes. A predetermined number of top ranked attributes from the plurality of attributes are caused to be presented. Further, an image associated with each of the top ranked attributes is determined, the image being designated as a visual representation of the corresponding (Continued)

top ranked attribute. The image is caused to be displayed in association with the product on a user interface.

20 Claims, 9 Drawing Sheets

(51) Int. Cl.
*G06F 16/58* (2019.01)
*G06F 16/248* (2019.01)
*G06F 16/28* (2019.01)
*G06F 16/2457* (2019.01)
*G06F 16/26* (2019.01)
*G06F 16/9535* (2019.01)

(52) U.S. Cl.
CPC ............ *G06F 16/26* (2019.01); *G06F 16/285* (2019.01); *G06F 16/58* (2019.01); *G06F 16/9535* (2019.01); *G06Q 30/0627* (2013.01)

(56) References Cited

U.S. PATENT DOCUMENTS

| | | | |
|---|---|---|---|
| 8,510,298 | B2 | 8/2013 | Khandelwal |
| 8,515,828 | B1* | 8/2013 | Wolf ...................... G06Q 30/02 705/26.7 |
| 8,639,036 | B1 | 1/2014 | Singer et al. |
| 8,949,252 | B2 | 2/2015 | Chittar et al. |
| 9,424,598 | B1 | 8/2016 | Kraft |
| 10,580,064 | B2 | 3/2020 | Vasthimal et al. |
| 2003/0088562 | A1 | 5/2003 | Dillon et al. |
| 2008/0091553 | A1 | 4/2008 | Koski |
| 2008/0162305 | A1* | 7/2008 | Rousso .................. G06Q 20/40 705/26.5 |
| 2012/0011142 | A1 | 1/2012 | Baheti et al. |
| 2012/0143883 | A1 | 6/2012 | Chen et al. |
| 2012/0239524 | A1 | 9/2012 | Ouimet et al. |
| 2013/0144604 | A1* | 6/2013 | Gopinathan .......... G06F 40/289 704/9 |
| 2013/0282704 | A1 | 10/2013 | Pantel et al. |
| 2014/0195348 | A1 | 7/2014 | Sun |
| 2014/0372216 | A1 | 12/2014 | Math et al. |
| 2015/0248589 | A1 | 9/2015 | Broache et al. |
| 2017/0068965 | A1* | 3/2017 | Parveen ............. G06Q 30/0633 |
| 2017/0193581 | A1 | 7/2017 | Vasthimal et al. |

OTHER PUBLICATIONS

Office Action Received for Korean Patent Application No. 1020187021979 dated Aug. 5, 2019, 14 pages (7 pages of English Translation & 7 pages of Official copy).
Final Rejection received for Korean Patent Application No. 10-2018-7021979, dated Oct. 12, 2019, 2 pages (1 page of English Translation & 1 page of Official copy).
Applicant Initiated Interview Summary Received for U.S Appl. No. 14/985,906, dated Jan. 17, 2019, 3 pages.
Final Office Action received for U.S. Appl. No. 14/985,906, dated Mar. 7, 2019, 16 pages.
Non-Final Office Action received for U.S. Appl. No. 14/985,906, dated Sep. 21, 2018, 17 pages.
Non-Final Office action received for U.S. Appl. No. 14/985,906, dated Apr. 4, 2019, 15 pages.
Notice of Allowance received for U.S. Appl. No. 14/985,906, dated Nov. 4, 2019, 10 pages.
Response to Non-Final Office Action filed on Dec. 20, 2018, for U.S. Appl. No. 14/985,906, dated Sep. 21, 2018, 23 pages.
Response to Non-Final Office Action filed on Jul. 2, 2019 for U.S. Appl. No. 14/985,906, dated Apr. 4, 2019, 14 pages.
Extended European Search Report Received or European Patent Application No. 16882675.8, dated Jul. 18, 2019, 9 pages.
Response to Extended European Search Report Filed on Jan. 29, 2020, for European Patent Application No. 16882675.8, dated Jul. 18, 2019, 13 pages.
Ghobadi et al., "A Virtual Catalog Generated from Web Pages of Vendors for Comparative Shopping", Fourth International Conference on Information Technology, Apr. 1, 2007, 6 pages.
International Preliminary Report on Patentability and Written Opinion received for PCT Patent Application No. PCT/US2016/69265, dated Jul. 12, 2018, 7 pages.
International Search Report received for PCT Patent Application No. PCT/US2016/069265, dated Mar. 13, 2017, 3 pages.
Written Opinion received for PCT Patent Application No. PCT/US2016/069265, dated Mar. 13, 2017, 5 pages.
Probst et al., "Extracting and Using Attribute-Value Pairs from Product Descriptions on the Web", Retrieved from the Internet: <https://pdfs.semanticscholar.org/2f42/1 f45c7c35624ebd8539774eddbc741eaOOd_pdf>, 2007, pp. 41-60.
Communication Pursuant to Article 94(3) EPC received for European Patent Application No. 168E12675.8, dated Feb. 12, 2021, 10 pages.

* cited by examiner

FIG. 4

SYSTEM, METHOD, AND MEDIA FOR IDENTIFYING TOP ATTRIBUTES

CROSS-REFERENCE TO RELATED APPLICATIONS

This application is a continuation of U.S. application Ser. No. 14/985,906, filed on Dec. 31, 2015, and entitled "User Interface for Identifying Top Attributes," which is hereby incorporated by reference in its entirety.

TECHNICAL FIELD

Embodiments of the present disclosure relate generally to generating and presenting user interface that identify top attributes.

BACKGROUND

There is a plethora of information surrounding content and items, including description, reviews by customers, reviews by experts, reviews by other third parties, and the like. Further, technologically advanced items have many attributes, incorporating features that highlight the capabilities of the item. Often, these attributes distinguish one item from others that are available. As technology advances, the attributes associated with these content and items become increasingly important for conveying specific capabilities, information, and use of a particular content or item.

BRIEF DESCRIPTION OF THE DRAWINGS

Various ones of the appended drawings merely illustrate example embodiments of the present disclosure and should not be considered as limiting its scope.

FIG. 4 depicts an example user interface for interactively presenting superimposed images, according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In various embodiments, systems and methods for identifying and presenting top attributes of a product based on detected product description and user comments are described. A product may contain a plethora of attributes, where some attributes are main highlights of the product based on the attributes having received more accolades and positive reviews than other attributes of the same product. These attributes are referred to as top attributes of a product. A filtering system provides functionality to determine the top attributes by, for example, extracting attributes associated with a product from a webpage, assigning a weight to each extracted attribute, and ranking the attributes based on the assigned weight.

Each top attribute has a corresponding image that is designated to represent the attribute. In some embodiments, the filtering system causes the images to be superimposed over an image of the product or a description of the product. These images allow for visual identification of the top attributes of the product from among a plethora of attributes that describe the product's capabilities. In some embodiments, a user interface allows for selection of one or more of the presented superimposed images representing the attributes, where selection of the superimposed images represents a selection of the corresponding top attribute. Selection of the superimposed images cause presentation of a user interface having information on other products that similarly possess the selected attributes as top attributes. As discussed throughout the specification, the term "items" can be in the form of products, publications, or other content.

Figure 1:
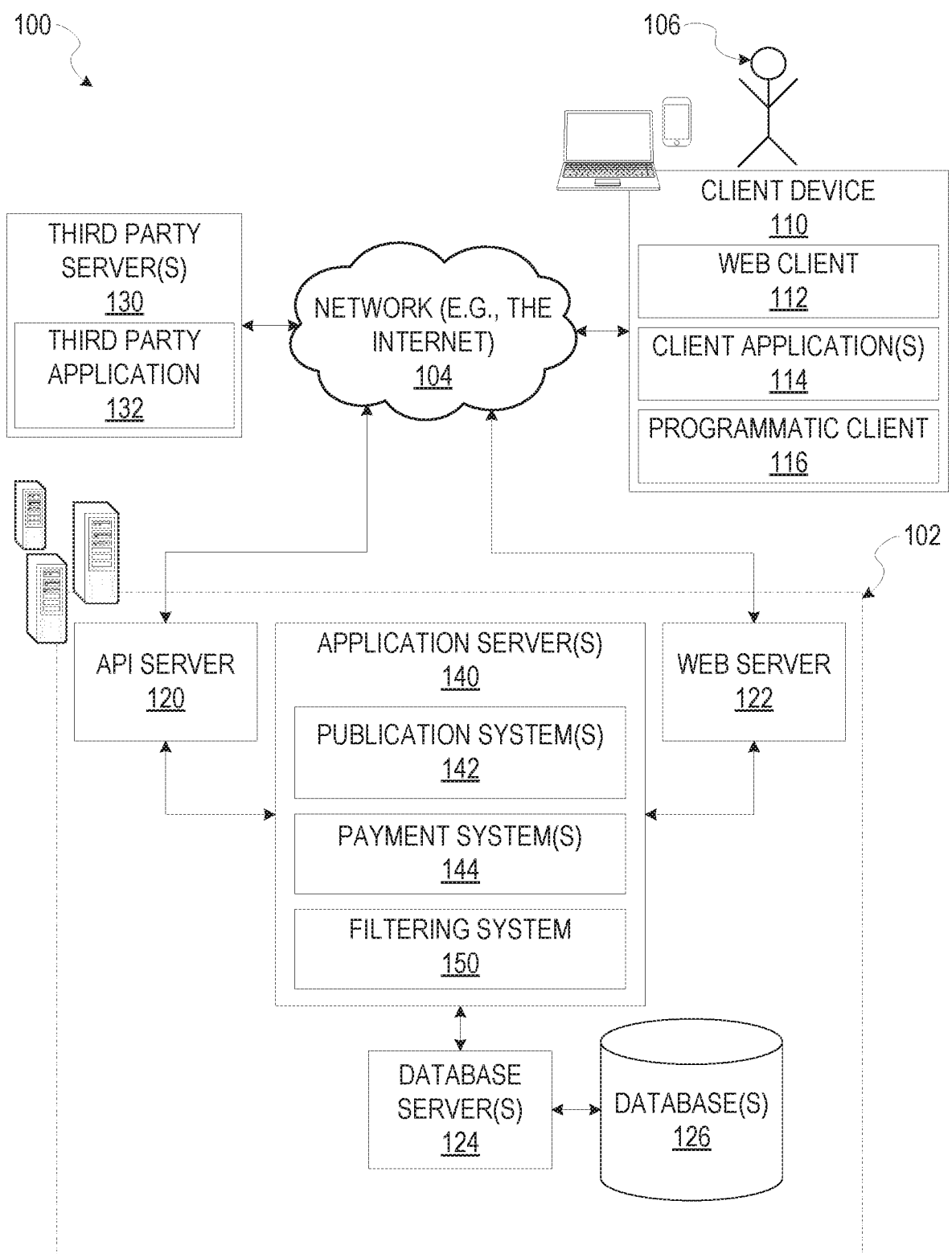
FIG. 1 is a block diagram illustrating a networked system, according to some example embodiments.

With reference to FIG. 1, an example embodiment of a high-level client-server-based network architecture 100 is shown. A networked system 102 provides server-side functionality via a network 104 (e.g., the Internet or wide area network (WAN)) to a client device 110. In some implementations, a user (e.g., user 106) interacts with the networked system 102 using the client device 110. FIG. 1 illustrates, for example, a web client 112 (e.g., a browser, such as the Internet Explorer' browser developed by Microsoft' Corporation of Redmond, Wash. State), client application(s) 114, and a programmatic client 116 executing on the client device 110. The client device 110 includes the web client 112, the client application(s) 114, and the programmatic client 116 alone, together, or in any suitable combination. Although FIG. 1 shows one client device 110, in other implementations, the network architecture 100 comprises multiple client devices.

In various implementations, the client device 110 comprises a computing device that includes at least a display and communication capabilities that provide access to the networked system 102 via the network 104. The client device 110 comprises, but is not limited to, a remote device, work station, computer, general purpose computer, Internet appliance, hand-held device, wireless device, portable device, wearable computer, cellular or mobile phone, Personal Digital Assistant (PDA), smart phone, tablet, ultrabook, netbook, laptop, desktop, multiprocessor system, microprocessor-based or programmable consumer electronic, game consoles, set-top box, network Personal Computer (PC), mini-computer, and so forth. In an example embodiment, the client device 110 comprises one or more of a touch screen, accelerometer, gyroscope, biometric sensor, camera, microphone, Global Positioning System (GPS) device, and the like.

The client device 110 communicates with the network 104 via a wired or wireless connection. For example, one or more portions of the network 104 comprises an ad hoc network, an intranet, an extranet, a Virtual Private Network (VPN), a Local Area Network (LAN), a wireless LAN (WLAN), a Wide Area Network (WAN), a wireless WAN (WWAN), a Metropolitan Area Network (MAN), a portion of the Internet, a portion of the Public Switched Telephone Network (PSTN), a cellular telephone network, a wireless network, a Wireless Fidelity (Wi-Fi®) network, a Worldwide Interoperability for Microwave Access (WiMax) network, another type of network, or any suitable combination thereof.

In some example embodiments, the client device 110 includes one or more of the applications (also referred to as "apps") such as, but not limited to, web browsers, book reader apps (operable to read e-books), media apps (operable to present various media forms including audio and video), fitness apps, biometric monitoring apps, messaging apps, electronic mail (email) apps, and e-commerce site apps (also referred to as "marketplace apps"). In some implementations, the client application(s) 114 include various components operable to present information to the user and communicate with networked system 102. In some embodiments, if the e-commerce site application is included in the client device 110, then this application is configured to locally provide the user interface and at least some of the functionalities with the application configured to communicate with the networked system 102, on an as needed basis, for data or processing capabilities not locally available (e.g., access to a database of items available for sale, to authenticate a user, to verify a method of payment). Conversely, if the e-commerce site application is not included in the client device 110, the client device 110 can use its web browser to access the e-commerce site (or a variant thereof) hosted on the networked system 102.

In various embodiments, the user (e.g., the user 106) comprises a person, a machine, or other means of interacting with the client device 110. In some example embodiments, the user is not be part of the network architecture 100, but interacts with the network architecture 100 via the client device 110 or another means. For instance, the user provides input (e.g., touch screen input or alphanumeric input) to the client device 110 and the input is communicated to the networked system 102 via the network 104. In this instance, the networked system 102, in response to receiving the input from the user, communicates information to the client device 110 via the network 104 to be presented to the user. In this way, the user can interact with the networked system 102 using the client device 110.

The web client 112 accesses the various systems of the networked system 102 (e.g., the publication system(s) 142) via the web interface supported by the web server 122. Similarly, the programmatic client 116 and client application(s) 114 accesses the various services and functions provided by the networked system 102 via the programmatic interface provided by the API server 120. The programmatic client 116 can, for example, be a seller application (e.g., the Turbo Lister application developed by eBay® Inc., of San Jose, Calif.) to enable sellers to author and manage listings on the networked system 102 in an off-line manner, and to perform batch-mode communications between the programmatic client 116 and the networked system 102.

An Application Program Interface (API) server 120 and a web server 122 is coupled to, and provide programmatic and web interfaces respectively to, one or more application server(s) 140. The application server(s) 140 hosts one or more publication system(s) 142, payment system(s) 144, and a filtering system 150, each of which comprises one or more modules or applications and each of which can be embodied as hardware, software, firmware, or any combination thereof. The application server(s) 140 are, in turn, shown to be coupled to one or more database server(s) 124 that facilitate access to one or more information storage repositories or database(s) 126. In an example embodiment, the database(s) 126 are storage devices that store information to be posted (e.g., publications or listings) to the publication system(s) 142. The database(s) 126 also stores digital good information in accordance with some example embodiments.

Additionally, a third party application 132, executing on third party server(s) 130, is shown as having programmatic access to the networked system 102 via the programmatic interface provided by the API server 120. For example, the third party application 132, utilizing information retrieved from the networked system 102, supports one or more features or functions on a website hosted by the third party. The third party website, for example, provides one or more promotional, marketplace, or payment functions that are supported by the relevant applications of the networked system 102.

The publication system(s) 142 provides a number of publication functions and services to the users that access the networked system 102. The payment system(s) 144 likewise provides a number of functions to perform or facilitate payments and transactions. While the publication system(s) 142 and payment system(s) 144 are shown in FIG. 1 to both form part of the networked system 102, it will be appreciated that, in alternative embodiments, each system 142 and 144 may form part of a payment service that is separate and distinct from the networked system 102. In some example embodiments, the payment system(s) 144 may form part of the publication system(s) 142.

In some implementations, the filtering system 150 provides functionality to determine top attributes associated with a product. The operations to determine top attributes include extracting attributes associated with a product from a webpage, assigning a weight to each extracted attribute, and ranking the attributes based on the assigned weight. In some embodiments, the filtering system 150 causes images to be superimposed over the product image or product description, the images representing the top attributes associated with the products. The images presented allow for visual identification of the top attributes of the product from among a plethora of attributes that describe the product's capabilities. These images, superimposed over the webpage content, can completely cover or partially cover the sections of the product image or product description. In other embodiments, the superimposed images do not cover the product image or product description. In yet further embodiments, a user interface allows for the selection of one or more of the presented superimposed images, where each of the superimposed images are associated with respective attributes. The selection of the superimposed images causes further presentation of a user interface displaying other products that similarly possess the selected attributes as top attributes. In example embodiments, the filtering system 150 communicates with the client device 110, the third party server(s) 130, the publication system(s) 142 (e.g., retrieving listings), and the payment system(s) 144 (e.g., purchasing an item in a listing). In one embodiment, the filtering system 150 is a part of the publication system(s) 142. The filtering system 150 will be discussed further in connection with FIG. 2 below.

Further, while the network architecture 100 shown in FIG. 1 employs a client-server architecture, the present inventive subject matter is, of course, not limited to such an architecture, and can equally well find application in a distributed, or peer-to-peer, architecture system, for example. The various systems of the applications server(s) 140 (e.g., the publication system(s) 142 and the payment system(s) 144) can also be implemented as standalone software programs, which do not necessarily have networking capabilities.

Figure 2:
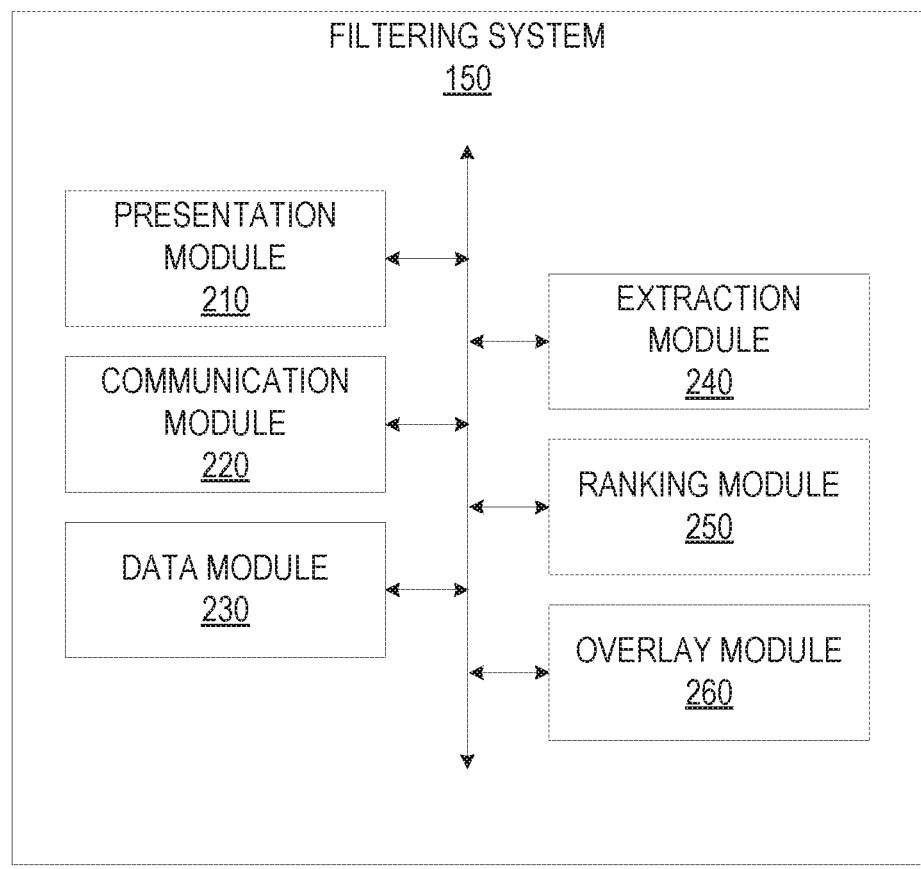
FIG. 2 is a block diagram illustrating an example embodiment of a filtering system, according to some example embodiments.

FIG. 2 is a block diagram of the filtering system 150 that provides functionality to determine top attributes associated with a product, according to example embodiments. In some embodiments, the filtering system 150 provides further functionality to determine an image associate with each of the top ranked attributes and causes the image to be displayed in association with the product on a user interface. The displayed image can be superimposed over a product image, superimposed over a product description, or displayed alongside the product image and the product description on the user interface. In one embodiment, the filtering system 150 includes a presentation module 210, a communication module 220, data module 230, extraction module 240, ranking module 250, and overlay module 260. All, or some, of the modules 210-260 of FIG. 2, communicate with each other, for example, via a network coupling, shared memory, bus, and the like. It will be appreciated that each module of modules 210-260 can be implemented as a single module, combined into other modules, or further subdivided into multiple modules. Other modules not pertinent to example embodiments can also be included in the filtering system 150, but are not shown.

In some implementations, the presentation module 210 provides various presentation and user interface functionality operable to interactively present and receive information from the user. For instance, the presentation module 210 causes presentation of top ranked attributes in association with a product on a user interface displayed on the client device. Further, the presentation module 210 causes images associated with the top ranked attributes to be displayed on the user interface. The displayed image can be superimposed over a product image, superimposed over a product description, or displayed alongside the product image and the product description. The presentation of superimposed images is further discussed in detail below in association with FIG. 4. Moreover, in response to a selection of one or more attributes (e.g., via the superimposed images), the presentation module 210 causes presentation of a new or revised user interface displaying information on other products that also include the selected attributes to be top attributes. The presentation of information on other products allows for comparison of products that include the selected top attribute(s). The presentation of other products that include similarly top attributes is further discussed in detail below in association with FIG. 5.

In various implementations, the presentation module 210 presents or causes presentation of information (e.g., visually displaying information on a screen, acoustic output, haptic feedback). Interactively presenting information is intended to include the exchange of information between a particular device and the user. The user may provide input to interact with the user interface in many possible manners such as alphanumeric, point based (e.g., cursor), tactile, or other input (e.g., touch screen, tactile sensor, light sensor, infrared sensor, biometric sensor, microphone, gyroscope, accelerometer, or other sensors), and the like. It will be appreciated that the presentation module 210 provides many other user interfaces to facilitate functionality described herein. Further, it will be appreciated that "presenting" as used herein is intended to include communicating information or instructions to a particular device that is operable to perform presentation based on the communicated information or instructions.

The communication module 220 provides various communications functionality and web services. For example, the communication module 220 provides network communication such as communicating with the networked system 102, the client device 110, and the third party server(s) 130. In various embodiments, the network communication can operate over wired or wireless modalities. Web services are intended to include retrieving information from the third party server(s) 130, the database(s) 126, and the application server(s) 140. In some implementations, information retrieved by the communication module 220 comprises data associated with the user (e.g., user profile information from an online account, social network service data associated with the user), data associated with one or more items or products listed on the publication system 142 (e.g., images of the item, reviews of the item, item price), or other data to facilitate the functionality described herein. In this way, the communication module 220 facilitates communication between the filtering system 150, the client device 110, and the third party server(s) 130 via the network 104.

The data module 230 is configured to provide functionality to access and update product information via database servers 124 in the database 126. The data module 230 accesses product data associated with available products for use by the extractor module 240. In an embodiment, the database 126 stores attribute information related to certain products, the products being stored in product categories. For example, the product is a camera and attributes related to the camera can be any attributes that make up a camera, such as lens quality, battery life, image quality, video quality, value, ergonomic quality, build quality, aesthetic sense, and the like. These attributes (e.g., primary attributes) can also include secondary attributes that are directly related to the primary attributes. For example, secondary attributes of the primary attribute "lens quality" can include zoom, auto focus technology, and the like.

Further, each attribute within the database 126 has an associated image that visually depicts the attribute. These images associated with its respective attribute can be in the form of an internationally recognized symbol used to designate the respective attribute or a custom made symbol. Images associated with its respective attribute is further discussed in detail below in association with FIG. 4. Each category can also have subcategories. In this specific camera category, for example, subcategories can be digital single-lens reflex (DSLR) camera, waterproof camera, video camera, security camera, and the like.

In some embodiments, the data module 230 stores a predetermined value associated with descriptors words that are used to describe certain attributes belonging to a product in the database 126. The predetermine value reflects a weight of the descriptor words when referring to the attribute. For example, a product review for a camera product can be, "best lens compared to its peers." The descriptor word "best" is describing the attribute "lens." Descriptor words can be in the form of positive words, neutral words, negative words, adjectives, adverbs, urban slang, and the like. Positive descriptor words include, but not limited to, superior, excellent, amazing, awesome, great, and the like. Negative descriptor words can include, but not limited to, disappointing, low quality, poor, bad, and the like. Urban slang descriptor words reflect words commonly used in a community but not officially recognized within any dictionary. The extraction module 240 provides functionality to identify and extract attributes of one or more products from any electronic document (e.g., a webpage). These attributes are identified by identifying a match between attributes from the electronic document and a set of attributes stored within the database 126 for the particular product category. The match between attributes need not be an exact match. For example, the attributes "lens" and "telephoto lens" identified in an electronic document can constitute as a match for the lens quality attribute within the database 126. The extraction module 240 may determine, from a database, a category of the product by extracting the attribute "lens" and matching the "lens" attribute with an attribute within the database. The "lens" attribute within the database is associated with a category and subcategory comprising other similar attributes. For example, the attribute "lens" is associated with a camera category, and the camera category comprises further attributes such as "telephoto lens." The extraction module 240 further identifies attributes in the extracted text content that match a set of attributes stored in the database from the category of the product.

In some embodiments, the extraction module 240 provides further functionality to identify and extract descriptor words describing one or more attributes of the product within the electronic document. The descriptor words are identified by identifying a match between the descriptor words in the electronic document and descriptor words stored within the database 126. The descriptor words are associated with the attributes that it describes and can occur immediately before the attribute or after.

In an example, for the description "awesome battery life," the extraction module 240 identifies the attribute "battery life" by identifying a match between the word "battery life" within the electronic document and the attribute "battery life" stored within the database 126. The descriptor words are then identified from words immediately before or after the attribute. In this example, the descriptor word is identified as "awesome" and occurs immediately before the attribute "battery life." In some embodiments, these descriptor words do not have to occur immediately before or after the attribute, but rather proximate to (e.g., nearby but not necessarily adjacent to) the attribute. Further, the descriptor words can be in the form of an adjective, adverb, or any other form that describes the attribute. The identification and association of a descriptor word with the corresponding attribute are further described in detail below in association with FIG. 3. In yet further embodiments, the attributes and descriptor words are identified and extracted from more than one electronic document, such as from multiple electronic documents from different domains. These attributes and descriptor words are aggregated and stored in the database 126 for use by the ranking module 250 and overlay module 260.

The ranking module 250 provides functionality to assign a weight to each descriptor words and rank the attributes based on the assigned weight. Each descriptor word has an associated weight stored in the database 126. In general, the more positive the descriptor word, the higher the assigned weight. The weight can be a numerical value, with a larger value indicating a higher weight. For example, descriptor words and assigned weight value relationship can include, "superior" assigned a weight value 9, "best" assigned a weight value 8, "awesome" assigned a weight value 7, "excellent" assigned a weight value 7, "ok" assigned a weight value 6, "decent" assigned a weight value 5, "poor" assigned a weight value 4, "disappointing" assigned a weight value 3, "terrible" assigned a weight value 2, and so forth. In some embodiments, different descriptor words can be assigned the same weight value.

In some embodiments, the ranking module 250 determines descriptor word outliers within all the descriptor words used to describe an attribute. The descriptor words that are determined to be outliers are not considered by the ranking module in ranking the attributes. Outliers can be determined by the ranking module 250 using z-score statistical measurement of a relationship of a descriptor word to a mean in a group of descriptor words describing the same attribute. A z-score measurement reflects how many standard deviations a descriptor word is away from the mean. Using the z-score, the ranking module 250 can determine outliers by comparing the z-score to a predetermine threshold range, where any z-scores above or below the threshold range indicate the associated descriptor word is an outlier. In some embodiments, the outliers are filtered and removed from further analysis. The outliers reflect noise in the accumulated data and may not accurately reflect the attribute. For example, in one hundred descriptor words describing the attribute of battery life of a camera, ninety-nine of the descriptor words are positive, whereas one is extremely negative. The one extremely negative descriptor word is determined to be an outlier, as it likely does not accurately reflect the battery life attribute and therefore considered as noise. In other embodiments, the outliers are determined using additional normal statistics, including mean, medium, and mode.

In further embodiments, the ranking module 250 calculates an average weight value associated with each attribute. Within an electronic document, there may be multiple descriptor words for an attribute. After the outliers are filtered, the remaining weighted values with a corresponding attribute is averaged and a single average weighed value is associated with an attribute. In some embodiments, the weighted value associated with the secondary attribute is counted as part of the primary words. For example, the descriptor word associated with secondary attribute "great zoom" and "excellent autofocus technology" counts towards the average weight value of the primary attribute "lens quality." Based on the average weight value, the ranking module 250 ranks the attributes based on the corresponding average weight value.

The overlay module 260 provides functionality to determine the images associated with each of a predetermined number of top ranked attributes. The top ranked attributes are the ones with top largest average weight value. In other words, the top ranked attributes reflects highlight features that stand out for the specific product as described by the product described and reviewed by other users. The top-n ranked attributes is the top predetermined number of attributes (e.g., a top 3 or any other number).

For each top ranked attribute, there is a corresponding image retrievable from the database 126 for inclusion in the user interface. As discussed above, the image can be an icon that is in the form of a universally recognized symbol or a custom image associated with the attribute. The overlay module 260 in association with the presentation module 210, as fully detailed above, cause these images to be superimposed over the content of a user interface. The content of the user interface remains visible where the image has not been superimposed. As described above, the images can be superimposed over the detailed description portion of the associated product, or over the image of the product itself. In some embodiments, the images can be superimposed over the location where the attribute is located and extracted from the electronic document. In other embodiments, the images are superimposed to a side of the electronic document and remains displayed as the content of the electronic document is scrolled to different pages. In other embodiments, the location of the top ranked attributes associated with the images are flagged and highlighted to further distinguish the top ranked attributes from other textual content.

Figure 3:
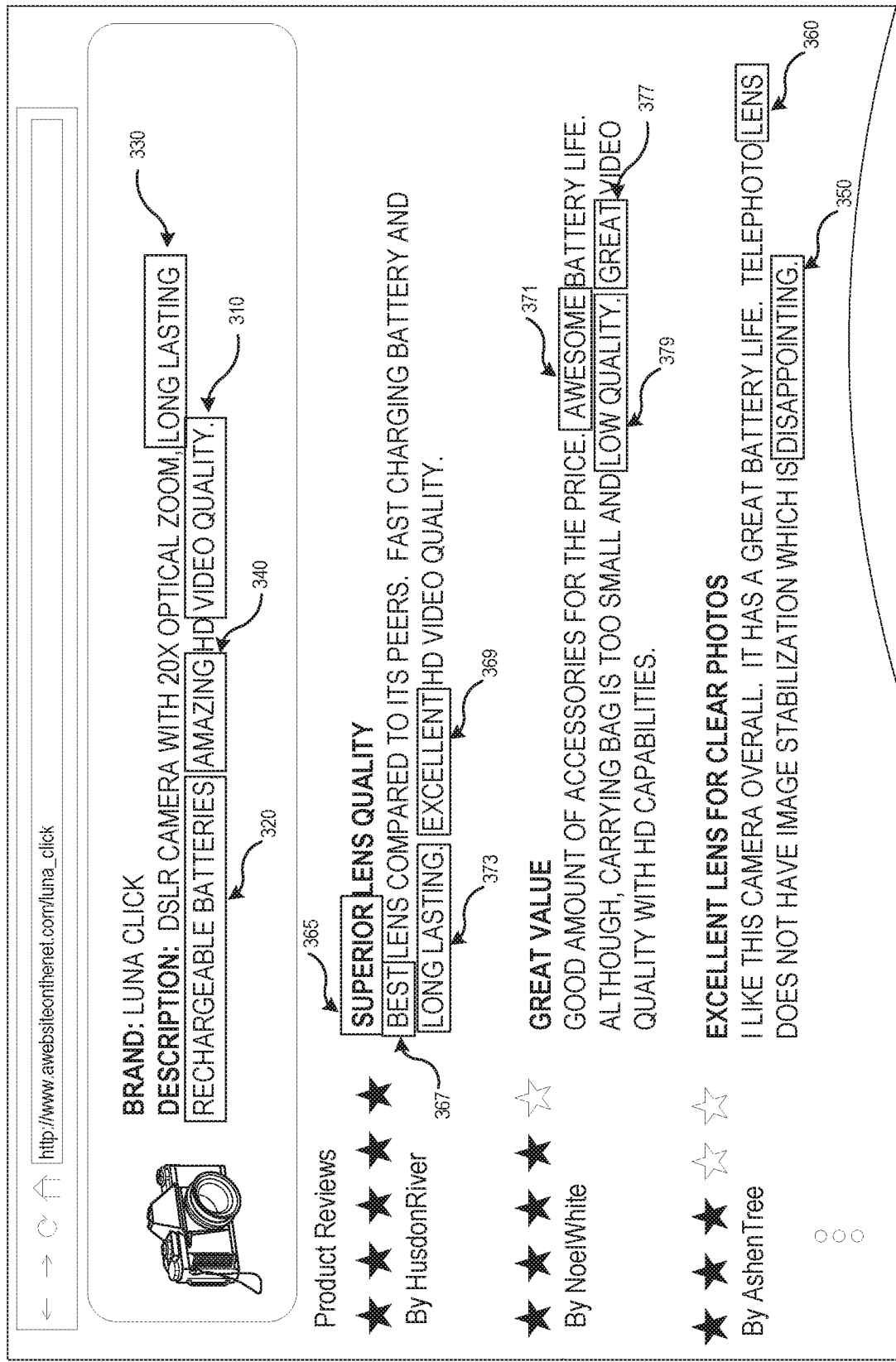
FIG. 3 is a diagram illustrating an example method for extracting descriptor words associated with product attributes, according to some example embodiments.

FIG. 3 is a diagram illustrating an example method for identifying and extracting descriptor words describing an attribute of a product within an electronic document (e.g., a webpage). The attributes within the webpage are identified by the extraction module 240 performing a search for a match between words on the webpage and the set of attributes within the database 126. For example, the attribute 310 is identified as "video quality" by a match of the attribute 310 on the web page with an attribute "video quality" within the database 126. The match between attributes need not be an exact match. For example, an attribute 320 "rechargeable batteries" can be considered a match to the attribute "battery life" within the database 126. Such a match is identified even where the terms are not identical and may be determined using a synonym list from the database 126. Further attributes may be identified and extracted within FIG. 3, but not currently described, such as lens quality, accessories, etc.

The extraction module 240 also identifies descriptor words 330 and 340, by identifying a description occurring proximate to the identified attribute 320 and 310. Descriptor words can occur immediately before (or proximately before) the attribute such as descriptor word 330. The descriptor word 330 "long lasting" describes the attribute 320 "rechargeable batteries." The descriptor words can also occur proximate and after the occurring attribute. For example, the descriptor word 350 "disappointing" describes the attribute 360 "lens." Descriptor words and corresponding attribute are identified as a corresponding pair based on its location within a single clause or phrase. Further descriptor words may be identified and extracted within FIG. 3, but not currently described, such as superior, best, great, excellent, awesome, etc. Further details were fully described above in association with FIG. 2.

In some embodiments, each extracted descriptor word is assigned a weight. The assigned weight is determined from the database 126. The assigned weight can be a numerical value, where a higher weight value reflects a more positive descriptor word. In some embodiments, different descriptor words can be assigned the same weight value. In an example, descriptor word 365 ("superior") is assigned a weight value 8, descriptor word 367 ("best") is assigned a weight value 7, descriptor word 369 ("excellent") is assigned a weight value 6, descriptor word 371 ("awesome") is assigned a weight value 6, descriptor word 340 ("amazing") is assigned a weight value 5, descriptor word 377 ("great") is assigned a weight value 4, descriptor word 373 ("long lasting") is assigned a weight value 3, descriptor word 379 ("low quality") is assigned a weight value 2, descriptor word 350 ("disappointing") is assigned a weight value 1, and so forth. In other embodiments, the weight may be a coefficient or any other type of weighting value.

In example embodiments, the ranking module 250 calculates an average weight value associated with each attribute. For example, the "video quality" attribute 310 has several associated descriptor words, including descriptor words 340, descriptor word 369 ("excellent"), and descriptor word 377 ("great") with an assigned weight value of 5, 6, and 4 respectively. The average weight for each attribute is determined by taking the average of all the weight values associated with the same attribute. In this example, the average weight for the attribute 310 "video quality" is 7.5 (the average of weight values 5, 6, and 4). Further details of the weight assignment were fully described above in association with the ranking module 250 in FIG. 2.

Figure 4:
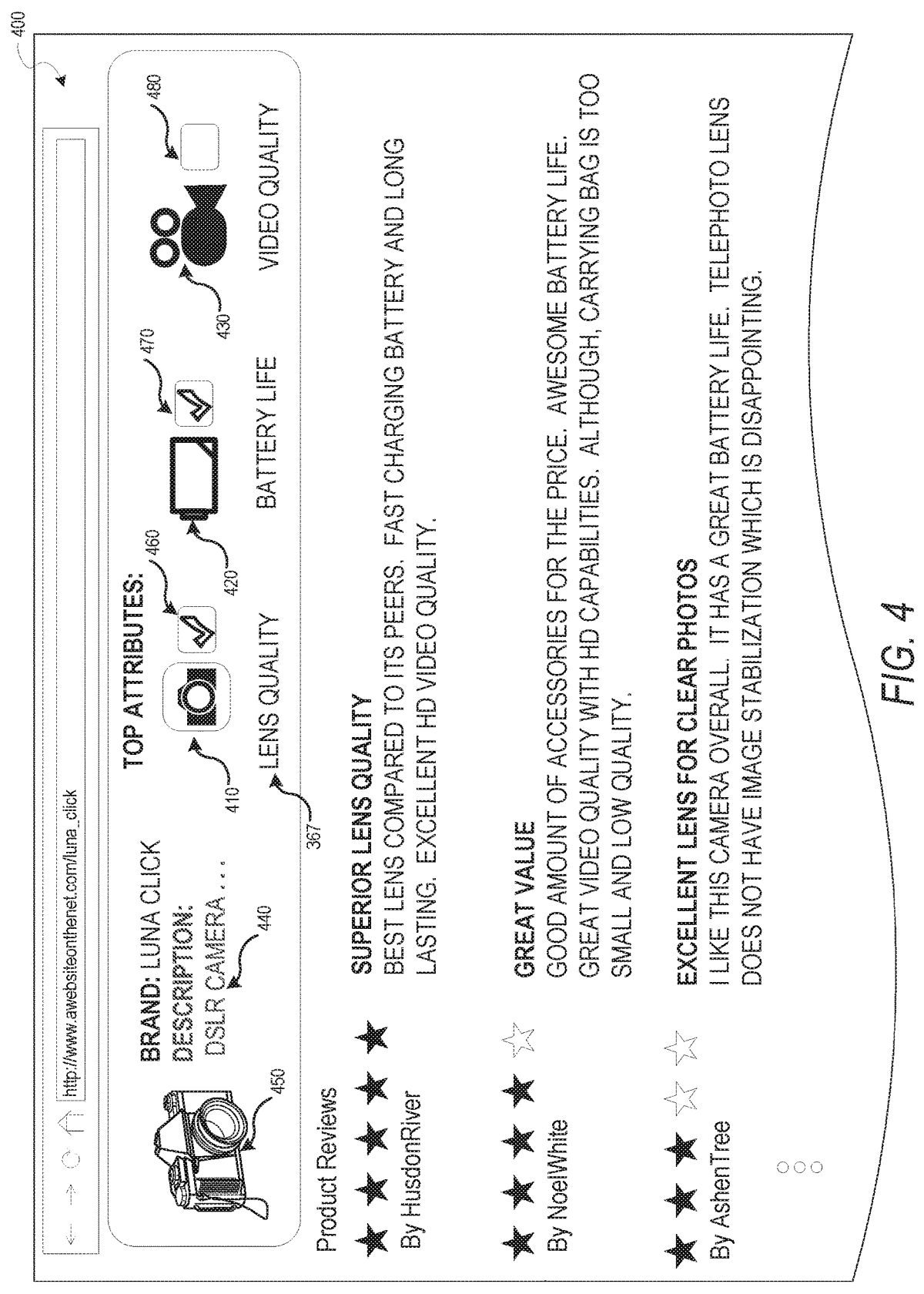
Figure 5:
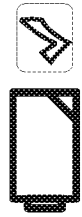
FIG. 5 depicts an example user interface for interactively presenting other products having the selected top attributes, according to some example embodiments.

FIGS. 4-5 depict example user interfaces for interactively presenting information to the user. Although FIGS. 4-5 depict specific example user interfaces and user interface elements, these are merely non-limiting examples and many other alternate user interfaces and user interface elements can be generated by the presentation module 210 and presented to the user. It will be noted that alternate presentations of the displays of FIGS. 4-5 may include additional information, graphics, options, and so forth; other presentations include less information, or provide abridged information for easy use by the user.

FIG. 4 is a diagram illustrating an example user interface 400 for interactively presenting an image associated with each of the top ranked attribute. Based on the calculated average weight value for each attribute, the ranking module 250 ranks the attributes based on the corresponding average weight value, where the higher the average weight value, the higher the associated attribute is ranked. Continuing from the example shown in FIG. 3, the top three attributes are determined to be attribute "lens quality", attribute "battery life", and attribute "video quality."

The overlay module 260 determines an image associated with each of the top ranked attributes. Although this example shows the top three attributes, it is understood that the top ranked attributes can be any predetermined number. The overlay module 260 accesses the database 126 to identify the image associated with each of the top three attributes. In this example, image 410 (representing "lens quality"), image 420 (representing "battery life"), and image 430 (representing video quality) are identified to be the images associated with each of the top three attributes. The images are caused to be presented on the user interface displaying the web page. Optionally, along with each image is a textual description presented to describe the image such as textual description 367 to describe the image 410.

In some embodiments, the image 410, 420, and 430 are superimposed over the product description 440. The images can be transparent thus allowing the product description 440 to be seen through the images. In other embodiments, the image 410, 420, and 430 are superimposed over the product image 450. In other embodiments, the images are superimposed to a side of the user interface and remains displayed as the content of the user interface is scrolled to different pages. In some embodiments, any content on the user interface can be seen through the superimposed images.

In some embodiments, the overlay module 260 presents selectable elements 460, 470, and 480, where selection of the selectable elements results in a selection of the associated top ranked attribute. The selection of selectable element 460 is a selection of the top attribute "lens quality," and the selection of selectable element 470 is a selection of the top attribute "battery life." A selection of the selectable elements 460 and 470 results in a search for other products that includes the selected attributes "lens quality" and "battery life" as top attributes for those products. For example, as shown in FIG. 5, the search results show other cameras with top attributes of lens quality and battery life, including camera 520, 530, and 540. In some embodiments, the product description shown for each product is truncated to show the comments associated with the top attributes. The user can further choose to view the full comments.

Figure 6:
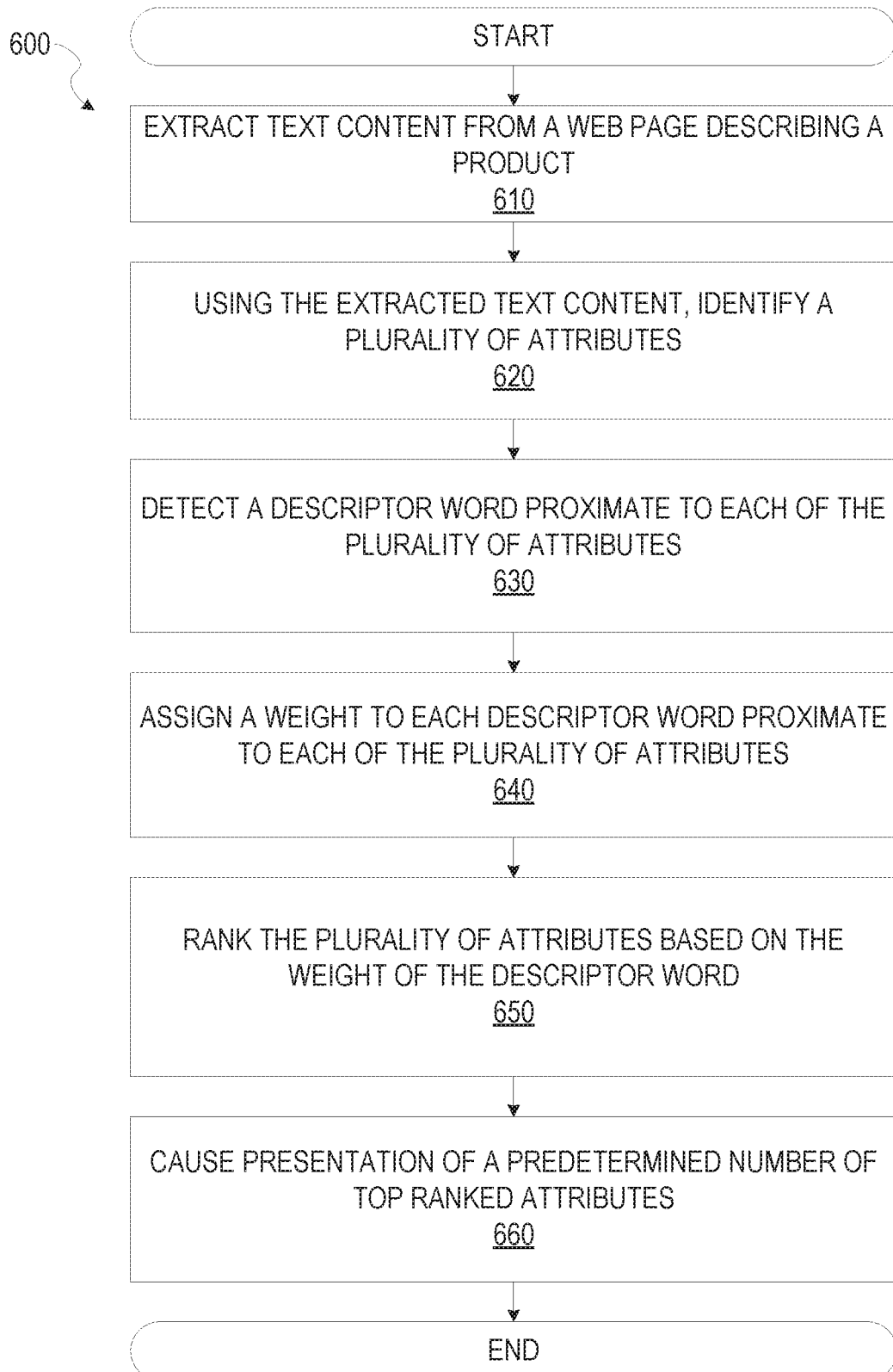
FIG. 6 is a flow diagram illustrating an example method for determining top attributes of a product, according to some example embodiments.

FIG. 6 is a flow diagram illustrating an example method 600 for determining the top ranked attributes for a product. At operation 610, the extraction module 240 extracts text content from a web page describing a product.

At operation 620, using the extracted text content, the extraction module 240 identifies a plurality of attributes associated with the product. The attributes are identified by performing a search for a match between the extracted text content from the webpage and the set of attributes within a database.

At operation 630, the extraction module 240 detects a descriptor word proximate to each of the plurality of attributes in the extracted text content. The descriptor words are associated with the attributes that in which it describes and can occur immediately before the attribute, immediately after the attribute, or located nearby the attribute. These descriptor words can be in the form of an adjective, adverb, or any other form that describes the attribute.

At operation 640, the ranking module 250 assigns a weight to each descriptor word proximate to each of the plurality of attributes. In general, the more positive the descriptor word, the higher the assigned weight. The weight can be a numerical value, with a larger value indicating a higher weight.

At operation 650, the ranking module 250 ranks the plurality of attributes based on the weight of the descriptor word proximate to each of the plurality of attributes.

At operation 660, the presentation module 210 causes presentation of a predetermined number of top ranked attributes from the plurality of attributes in a user interface.

Figure 7:
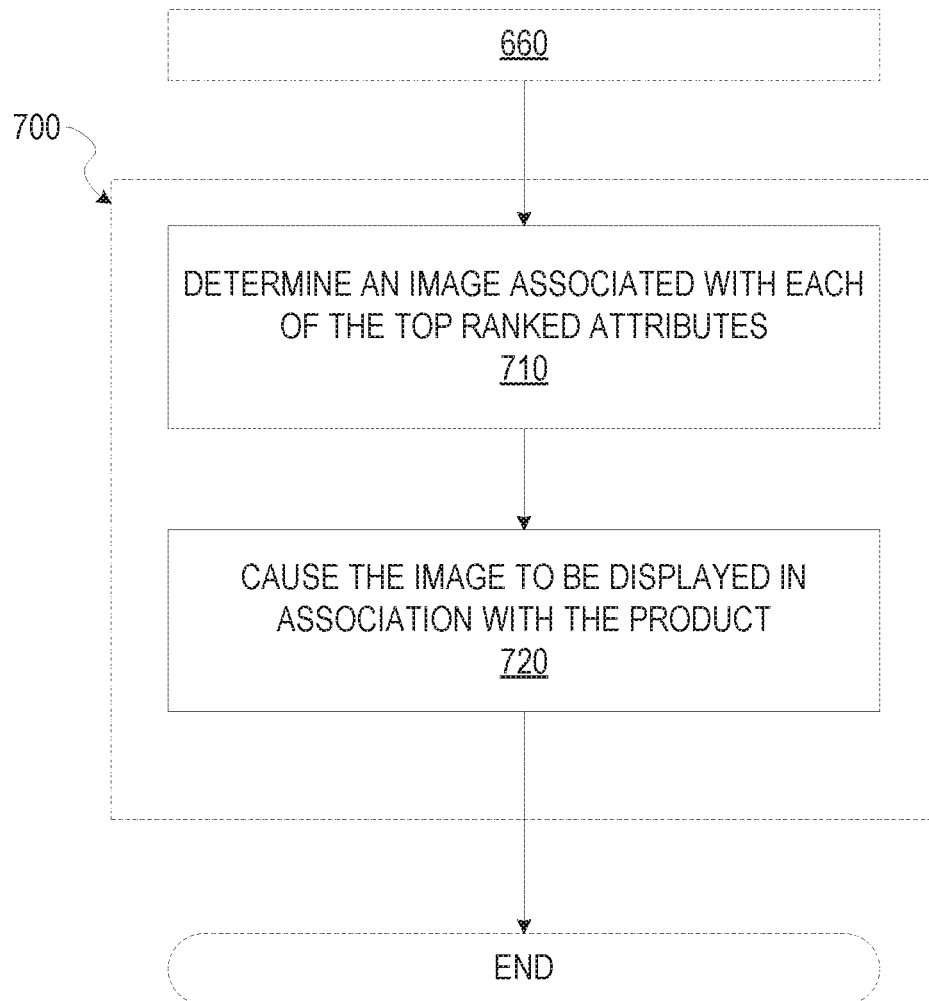
FIG. 7 is a flow diagram illustrating an example method for determining images associated with the top ranked attributes, according to some example embodiments.

FIG. 7 is a flow diagram illustrating an example method 700 for presenting images associated with each of the top ranked attributes. At operation 710, the overlay module 260 determines an image associated with each of the top ranked attributes. The image can be an icon that is in the form of a universally recognized symbol or a custom image designated to the attribute as fully described in detail in association with FIG. 5.

At operation 720, the presentation module 210 causes the images to be displayed in associated with the product on the user interface. The display can superimposed the images over the content of the user interface, such as over the image of the product, the description of the product, or to the side of the webpage, along an axis as fully described in detail in association with FIG. 5.

Modules, Components, and Logic

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Software Architecture

Figure 8:
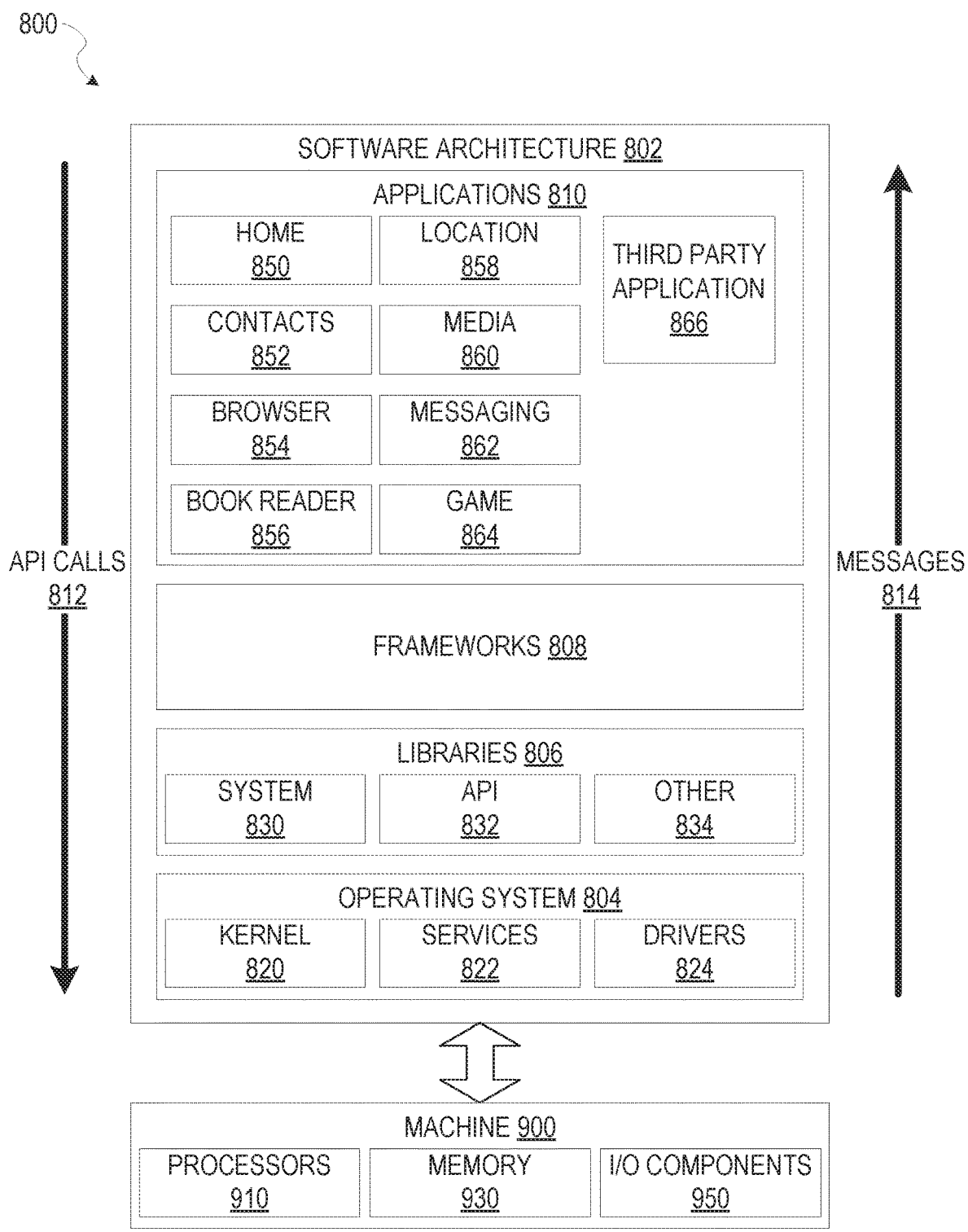
FIG. 8 is a block diagram illustrating an example of a software architecture that may be installed on a machine, according to some example embodiments.

FIG. 8 is a block diagram 800 illustrating an architecture of software 802, which may be installed on any one or more of the devices described above. FIG. 8 is merely a non-limiting example of a software architecture, and it will be appreciated that many other architectures may be implemented to facilitate the functionality described herein. The software 802 may be implemented by hardware such as machine 900 of FIG. 9 that includes processors 910, memory 930, and I/O components 950. In this example architecture, the software 802 may be conceptualized as a stack of layers where each layer may provide a particular functionality. For example, the software 802 includes layers such as an operating system 804, libraries 806, frameworks 808, and applications 810. Operationally, the applications 810 invoke application programming interface (API) calls 812 through the software stack and receive messages 814 in response to the API calls 812, according to some implementations.

In various implementations, the operating system 804 manages hardware resources and provides common services. The operating system 804 includes, for example, a kernel 820, services 822, and drivers 824. The kernel 820 acts as an abstraction layer between the hardware and the other software layers in some implementations. For example, the kernel 820 provides memory management, processor management (e.g., scheduling), component management, networking, security settings, among other functionality. The services 822 may provide other common services for the other software layers. The drivers 824 may be responsible for controlling or interfacing with the underlying hardware. For instance, the drivers 824 may include display drivers, camera drivers, Bluetooth® drivers, flash memory drivers, serial communication drivers (e.g., Universal Serial Bus (USB) drivers), Wi-Fig' drivers, audio drivers, power management drivers, and so forth.

In some implementations, the libraries 806 provide a low-level common infrastructure that may be utilized by the applications 810. The libraries 806 may include system 830 libraries (e.g., C standard library) that may provide functions such as memory allocation functions, string manipulation functions, mathematic functions, and the like. In addition, the libraries 806 may include API libraries 832 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 806 may also include a wide variety of other libraries 834 to provide many other APIs to the applications 810.

The frameworks 808 provide a high-level common infrastructure that may be utilized by the applications 810, according to some implementations. For example, the frameworks 808 provide various graphic user interface (GUI) functions, high-level resource management, high-level location services, and so forth. The frameworks 808 may provide a broad spectrum of other APIs that may be utilized by the applications 810, some of which may be specific to a particular operating system or platform.

In an example embodiment, the applications 810 include a home application 850, a contacts application 852, a browser application 854, a book reader application 856, a location application 858, a media application 860, a messaging application 862, a game application 864, and a broad assortment of other applications such as third party application 866. According to some embodiments, the applications 810 are programs that execute functions defined in the programs. Various programming languages may be employed to create one or more of the applications 810, structured in a variety of manners, such as object-orientated programming languages (e.g., Objective-C, Java, or C++) or procedural programming languages (e.g., C or assembly language). In a specific example, the third party application 866 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 866 may invoke the API calls 812 provided by the mobile operating system 804 to facilitate functionality described herein.

Example Machine Architecture and
Machine-Readable Medium

Figure 9:
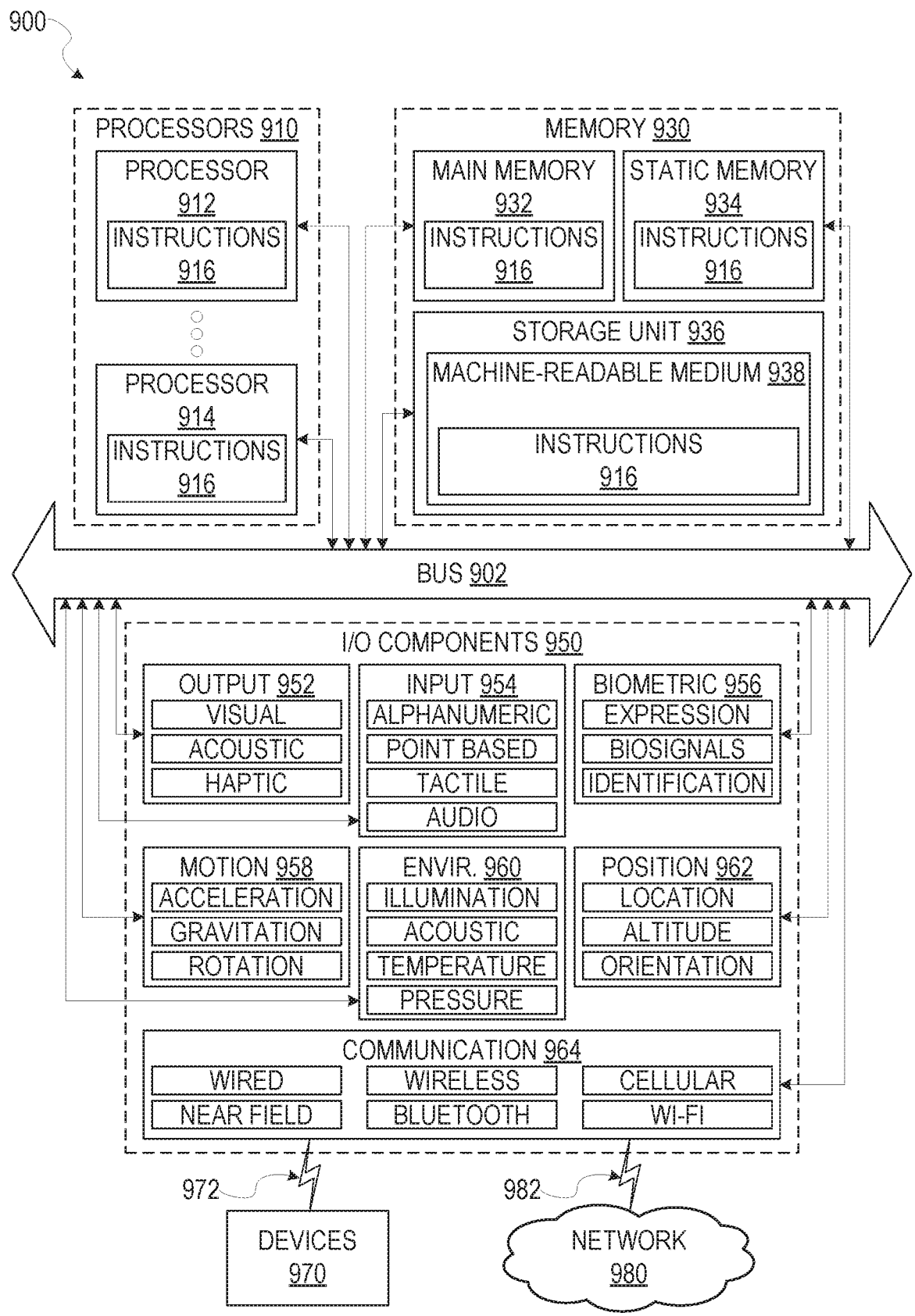
FIG. 9 illustrates a diagrammatic representation of a machine in the form of a computer system within which a set of instructions may be executed for causing the machine to perform any one or more of the methodologies discussed herein, according to an example embodiment.

FIG. 9 is a block diagram illustrating components of a machine 900, according to some example embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by machine 900. Further, while only a single machine 900 is illustrated, the term "machine" shall also be taken to include a collection of machines 900 that individually or jointly execute the instructions 916 to perform any one or more of the methodologies discussed herein.

The machine 900 may include processors 910, memory 930, and I/O components 950, which may be configured to communicate with each other via a bus 902. In an example embodiment, the processors 910 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 912 and processor 914 that may execute instructions 916. The term "processor" is intended to include multi-core processors that may comprise two or more independent processors (also referred to as "cores") that may execute instructions contemporaneously. Although FIG. 9 shows multiple processors, the machine 900 may include a single processor with a single core, a single processor with multiple cores (e.g., a multi-core process), multiple processors with a single core, multiple processors with multiples cores, or any combination thereof.

The memory 930 may include a main memory 932, a static memory 934, and a storage unit 936 accessible to the processors 910 via the bus 902. The storage unit 936 may include a machine-readable medium 938 on which is stored the instructions 916 embodying any one or more of the methodologies or functions described herein. The instructions 916 may also reside, completely or at least partially, within the main memory 932, within the static memory 934, within at least one of the processors 910 (e.g., within the processor's cache memory), or any suitable combination thereof, during execution thereof by the machine 900. Accordingly, in various implementations, the main memory 932, static memory 934, and the processors 910 are considered as machine-readable media 938.

As used herein, the term "memory" refers to a machine-readable medium 938 able to store data temporarily or permanently and may be taken to include, but not be limited to, random-access memory (RAM), read-only memory (ROM), buffer memory, flash memory, and cache memory. While the machine-readable medium 938 is shown in an example embodiment to be a single medium, the term "machine-readable medium" should be taken to include a single medium or multiple media (e.g., a centralized or distributed database, or associated caches and servers) able to store instructions 916. The term "machine-readable medium" shall also be taken to include any medium, or combination of multiple media, that is capable of storing instructions (e.g., instructions 916) for execution by a machine (e.g., machine 900), such that the instructions, when executed by one or more processors of the machine 900 (e.g., processors 910), cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 950 include a wide variety of components to receive input, provide output, produce output, transmit information, exchange information, capture measurements, and so on. In general, it will be appreciated that the I/O components 950 may include many other components that are not shown in FIG. 9. The I/O components 950 are grouped according to functionality merely for simplifying the following discussion and the grouping is in no way limiting. In various example embodiments, the I/O components 950 include output components 952 and input components 954. The output components 952 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 954 include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and force of touches or touch gestures, or other tactile input components), audio input components (e.g., a microphone), and the like.

In some further example embodiments, the I/O components 950 include biometric components 956, motion components 958, environmental components 960, or position components 962 among a wide array of other components. For example, the biometric components 956 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 958 include acceleration sensor components (e.g., accelerometer), gravitation sensor components, rotation sensor components (e.g., gyroscope), and so forth. The environmental components 960 include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., machine olfaction detection sensors, gas detection sensors to detection concentrations of hazardous gases for safety or to measure pollutants in the atmosphere), or other components that may provide indications, measurements, or signals corresponding to a surrounding physical environment. The position components 962 include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 950 may include communication components 964 operable to couple the machine 900 to a network 980 or devices 970 via coupling 982 and coupling 972, respectively. For example, the communication components 964 include a network interface component or another suitable device to interface with the network 980. In further examples, communication components 964 include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 970 may be another machine or any of a wide variety of peripheral devices (e.g., a peripheral device coupled via a Universal Serial Bus (USB)).

Moreover, in some implementations, the communication components 964 detect identifiers or include components operable to detect identifiers. For example, the communication components 964 include Radio Frequency Identification (RFID) tag reader components, NFC smart tag detection components, optical reader components (e.g., an optical sensor to detect a one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, Uniform Commercial Code Reduced Space Symbology (UCC RSS)-2D bar code, and other optical codes), acoustic detection components (e.g., microphones to identify tagged audio signals), or any suitable combination thereof. In addition, a variety of information can be derived via the communication components 964, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 980 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi network, another type of network, or a combination of two or more such networks. For example, the network 980 or a portion of the network 980 may include a wireless or cellular network and the coupling 982 may be a Code Division Multiple Access (CDMA) connection, a Global System for Mobile communications (GSM) connection, or other type of cellular or wireless coupling. In this example, the coupling 982 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

In example embodiments, the instructions 916 are transmitted or received over the network 980 using a transmission medium via a network interface device (e.g., a network interface component included in the communication components 964) and utilizing any one of a number of well-known transfer protocols (e.g., Hypertext Transfer Protocol (HTTP)). Similarly, in other example embodiments, the instructions 916 are transmitted or received using a transmission medium via the coupling 972 (e.g., a peer-to-peer coupling) to devices 970. The term "transmission medium" shall be taken to include any intangible medium that is capable of storing, encoding, or carrying instructions 916 for execution by the machine 900, and includes digital or analog communications signals or other intangible medium to facilitate communication of such software.

Furthermore, the machine-readable medium 938 is non-transitory (in other words, not having any transitory signals) in that it does not embody a propagating signal. However, labeling the machine-readable medium 938 as "non-transitory" should not be construed to mean that the medium is incapable of movement; the medium should be considered as being transportable from one physical location to another. Additionally, since the machine-readable medium 938 is tangible, the medium may be considered to be a machine-readable device.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
one or more processors; and
computer-readable memory including instructions that when executed by the one or more processors, cause the one or more processors to perform operations comprising:
extracting text content from an electronic document describing a product;
using the extracted text content, identifying a plurality of attributes associated with the product;
ranking the plurality of attributes; and
causing generation of a user interface that includes at least one image, the at least one image being a visual depiction of a top ranked attribute based on the ranking of the plurality of attributes.

2. The system of claim 1, further comprising detecting descriptor words associated with the plurality of attributes in the extracted text content, wherein the plurality of attributes is ranked based on the descriptor words.

3. The system of claim 1, wherein the generated user interface comprises a product image of the product, the visual depiction of the top ranked attribute being superimposed over the product image.

4. The system of claim 1, wherein the generated user interface comprises a product description area for the product, the visual depiction of the top ranked attribute being superimposed over the product description area.

5. The system of claim 1, wherein the generated user interface comprises content associated with the product, the visual depiction of the top ranked attribute being generated to a side of the content, wherein the visual depiction of the top ranked attribute remains displayed as the content of the user interface is scrolled to different pages.

6. The system of claim 1, further comprising:
receiving a selection at the visual depiction of the top ranked attribute; and
based on the selection, generating a second user interface comprising a product image associated with a different product, the different product having the top ranked attribute.

7. The system of claim 1, wherein the electronic document is a webpage associated with the product, and wherein the text content is extracted from a product review provided at the webpage associated with the product.

8. The system of claim 1, wherein the generated user interface comprises a plurality of images that are visual depictions of top ranked attributes, each image associated with a selectable option, the selectable options configured to allow selection of more than one of the top ranked attributes.

9. A computerized method performed by one or more processors, the method comprising:
extracting text content from product reviews describing a product;
identifying attributes of the product;
ranking the identified attributes based on the extracted text content; and
causing generation of a user interface that includes at least one image that is a visual depiction of a top ranked attribute determined from the ranking.

10. The method of claim 9, wherein the generated user interface comprises a product image or a product description section for the product, wherein the visual depiction of the top ranked attribute is superimposed over the product image or the product description section.

11. The method of claim 10, wherein the visual depiction of the top ranked attribute is superimposed to be at least partially transparent to the product image or the product description section.

12. The method of claim 9, wherein the generated user interface includes a plurality of images that are visual depictions of top ranked attributes, the visual depictions of the top ranked attributes having selectable options configured to allow selection of more than one of the top ranked attributes.

13. The method of claim 12, further comprising:
receiving a selection of a combination of top ranked attributes, the combination selected from the selectable options of the visual depictions; and
causing generation of another graphical user interface that includes a different product, the different product having attributes matching the selected combination of top ranked attributes.

14. The method of claim 9, wherein the generated user interface comprises content associated with the product, the visual depiction of the top ranked attribute being generated to a side of the content, wherein the visual depiction of the top ranked attribute remains displayed as the content of the user interface is scrolled to different pages.

15. The method of claim 9, wherein the text content includes descriptor words proximate to the attributes, and wherein the attributes are ranked based on the descriptor words.

16. One or more non-transitory computer readable media having instructions stored thereon that when executed by one or more processors, cause the one or more processors to perform a method comprising:
extracting text content from a webpage describing a product;
ranking attributes of the product based on the extracted text content; and causing generation of a user interface that includes at least one image that is a visual depiction of a top ranked attribute determined from the ranking.

17. The media of claim 16, wherein the text content includes descriptor words proximate to the attributes, and wherein the attributes are ranked based on the descriptor words.

18. The media of claim 16, wherein the generated user interface comprises a product image or a product description section for the product, wherein the visual depiction of the top ranked attribute is superimposed over the product image or the product description section.

19. The media of claim 18, wherein the visual depiction of the top ranked attribute is superimposed to be at least partially transparent to the product image or the product description section.

20. The media of claim 16, wherein the generated user interface includes a plurality of images that are visual depictions of top ranked attributes, the visual depictions of the top ranked attributes having selectable options configured to allow selection of more than one of the top ranked attributes.

\* \* \* \* \*